United States Patent
Hinman et al.

(10) Patent No.: US 8,937,532 B2
(45) Date of Patent: Jan. 20, 2015

(54) READING RFID TAG USING ANTENNA WITHIN ENCLOSURE

(75) Inventors: Mark P. Hinman, Holley, NY (US); Edward Zogg, Ontario, NY (US); Abhishek Sharma, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 290 days.

(21) Appl. No.: 13/532,840

(22) Filed: Jun. 26, 2012

(65) Prior Publication Data

US 2013/0342320 A1 Dec. 26, 2013

(51) Int. Cl.
*H04Q 5/22* (2006.01)
*G08B 13/14* (2006.01)
*G08B 1/08* (2006.01)
*H01Q 1/50* (2006.01)

(52) U.S. Cl.
USPC .......... 340/10.1; 340/572.1; 340/539.26; 340/568.1; 343/846; 343/850; 343/909; 220/592.26; 220/592.03; 220/592.25; 220/592.27; 62/127; 62/441

(58) Field of Classification Search
USPC .............................. 340/10.1, 572.1
See application file for complete search history.

(56) References Cited

U.S. PATENT DOCUMENTS

| | | | |
|---|---|---|---|
| 5,523,750 A * | 6/1996 | de Vall | 340/870.31 |
| 6,725,014 B1 | 4/2004 | Voegele | |
| 7,086,587 B2 | 8/2006 | Myllymaki | |
| 7,969,286 B2 | 6/2011 | Adelbert | |
| 7,973,645 B1 * | 7/2011 | Moretti et al. | 340/10.1 |
| 8,025,228 B2 | 9/2011 | Dearing et al. | |
| 2007/0001809 A1 * | 1/2007 | Kodukula et al. | 340/10.1 |
| 2007/0018904 A1 * | 1/2007 | Smith | 343/893 |
| 2007/0077888 A1 | 4/2007 | Forster | |
| 2007/0208445 A1 | 9/2007 | Gibson et al. | |
| 2008/0150691 A1 * | 6/2008 | Knadle et al. | 340/10.1 |
| 2009/0021343 A1 | 1/2009 | Sinha | |
| 2009/0174556 A1 | 7/2009 | Horne et al. | |
| 2009/0201152 A1 * | 8/2009 | Karr et al. | 340/545.6 |
| 2009/0302972 A1 | 12/2009 | Osamura et al. | |
| 2010/0067210 A1 * | 3/2010 | Sato et al. | 361/818 |
| 2010/0079253 A1 * | 4/2010 | Phipps et al. | 340/10.1 |
| 2010/0102969 A1 | 4/2010 | Svalesen et al. | |
| 2010/0265302 A1 | 10/2010 | Laramie et al. | |
| 2010/0277319 A1 * | 11/2010 | Goidas et al. | 340/572.1 |
| 2010/0282639 A1 * | 11/2010 | Lang et al. | 206/719 |
| 2011/0210176 A1 | 9/2011 | King | |

FOREIGN PATENT DOCUMENTS

JP 2009077310 A * 4/2009

* cited by examiner

*Primary Examiner* — Fekadeselassie Girma
(74) *Attorney, Agent, or Firm* — Christopher J. White; Raymond L. Owens (57) ABSTRACT

A method of reading an RFID tag using an RFID reader includes providing an RF-blocking enclosure having a port. The RFID reader has an antenna located within the enclosure. The enclosure is positioned so that the port is adjacent to a conductive surface and the RFID tag is within the enclosure. The RFID reader is activated at a selected read power level to read the tag in the enclosure.

10 Claims, 4 Drawing Sheets

READING RFID TAG USING ANTENNA WITHIN ENCLOSURE

CROSS-REFERENCE TO RELATED APPLICATIONS

This application is co-filed with and has related subject matter to U.S. patent application Ser. No. 13/532,824 filed Jun. 26, 2012, titled "RFID SYSTEM WITH MULTIPLE TAG TRANSMIT FREQUENCIES;" U.S. patent application Ser. No. 13/532,845 filed Jun. 26, 2012, titled "RFID READING SYSTEM USING RF GRATING;" U.S. patent application Ser. No. 13/532,859 filed Jun. 26, 2012, titled "RFID SYSTEM WITH ENCLOSURE AND INTERFERENCE PATTERN;" U.S. patent application Ser. No. 13/532,874 filed Jun. 26, 2012, titled "RFID SYSTEM WITH BARRIERS AND KEY ANTENNAS;" U.S. patent application Ser. No. 13/532,831 filed Jun. 26, 2012, titled "RFID SYSTEM WITH MULTIPLE READER TRANSMIT FREQUENCIES;" and U.S. patent application Ser. No. 13/532,826 filed Jun. 26, 2012, titled "RFID SYSTEM WITH CONFIGURABLE RF PORT;" all of which are incorporated herein by reference.

FIELD OF THE INVENTION

This invention pertains to the field of radio-frequency communication between radio-frequency identification (RFID) tags and RFID readers, and more particularly reading RFID tags securely.

BACKGROUND OF THE INVENTION

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), 2.4 GHz, or 5.8 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

However, RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data. This process is called "skimming," and such rogue readers are referred to as "skimmers." The skimmer can later replay the stored data (a "replay attack") to pretend to be the skimmed tag ("spoofing"). This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Horne et al. describes an RFID blocker that disrupts an RFID reader's signal to a tag when the blacker is physically near the tag. However, the blocker will disrupt all accesses, not just unauthorized access. In another scheme, U.S. Patent Publication No. 2009/0021343 by Sinha describes jamming or spoofing skimmers, either using authorized electronics or intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag.

Moreover, tags affixed to objects are often used in factory or retail contexts in which a large number of tagged instances or packages (e.g., as described in U.S. Patent Publication No. 2009/0302972) carry RFID tags. This can result in contention between tags for the bandwidth, reducing the number of tags that can be read in a certain amount of time. For example, U.S. Patent Publication No. 2010/0265302 describes RFID tags on liquid ink containers. However, this reference does not recognize difficulties that can be encountered in reading RFID tags attached to RF-attenuating containers of liquid. Moreover, containers can come in various sizes and shapes, which can require adjusting antenna directions and gains to read at a desired rate of read success.

U.S. Patent Publication No. 2010/0102969 describes a "Faraday shield" that reduces reading of unwanted RFID objects. This shield affects the radiation pattern of the antennas to reduce their power in the direction of the unwanted objects, but does not control access to tags in the direction of wanted objects. Consequently, an unwanted rogue tag, which could be active instead of passive, and thus much higher-powered than a standard tag, could still be accessed by the reader. Moreover, the shield might increase gain in the wanted direction, making it easier for an attacker to place a rogue tag within range of the reader.

U.S. Patent Publication No. 2009/0174556 by Horne et al. describes an RFID blocker that disrupts an RFID reader's signal to a tag when the blocker is physically near the tag. However, the blocker will disrupt all accesses, not just unauthorized access. Moreover, this scheme requires the blocker and the tag be moved apart from each other to access the tag.

There is a continuing need, therefore, for a way of controlling access to RFID tags located in fixed positions, e.g., attached to containers.

U.S. Pat. No. 8,025,228 describes distribution of products in a restricted access unit near the customer. Products are equipped with RF tags. A plurality of RF tagged products is placed within a cabinet that has a door or opening that can detect access to the cabinet. One or more antennas are positioned within the door. Each antenna may have a transmission line of sight and be configured to emit a signal at predefined frequencies. Each antenna produces an electromagnetic field within the micro-warehouse. In one embodiment, the products are positioned in one or more bins, compartments, or similar devices located within the micro-warehouse such that at least two of the plurality of products are spaced a distance from each other to reduce energy sharing. The electromagnetic field is moved or altered within the micro-warehouse through the use of reflectors, devices that move the antennas, or other mechanisms. However, this scheme is not applicable to environments such as retail stockrooms in which the tagged items are not confined in a cabinet.

There is, therefore, a continuing need for ways of reading RFID tags securely, in tag-rich environments.

SUMMARY OF THE INVENTION

According to an aspect of the present invention, there is provided a method of reading an RFID tag using an RFID reader, comprising:

providing an RF-blocking enclosure having a port, wherein an antenna of the RFID reader is located within the enclosure;

positioning the enclosure so that the port is adjacent to a conductive surface and the RFID tag is within the enclosure; and activating the RFID reader at a selected read power level to read the tag in the enclosure.

An advantage of this invention is that it locally encapsulates the tag during reading so that it is known which tag was read. An operator can manipulate the enclosure to determine which tag should be read or was just read. The enclosure reduces the probability that skimmers will be able to receive or capture information from the RFID tag. In various embodiments, the enclosure maintains the reader antenna and the tag in a selected spatial relationship (e.g., ¼ λ apart). This can provide a consistent reader power requirement regardless of what the conductive surface is attached to or part of. For example, in various embodiments, the conductive surface is part of the outer wall of a container. Containers of any size and shape can be used without reconfiguring the reader or its antenna since the enclosure maintains the tag-antenna spacing and orientation regardless of container. Various embodiments use tagged containers to reduce the probability of misinstalling ink containers in a printer.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Figure 1:
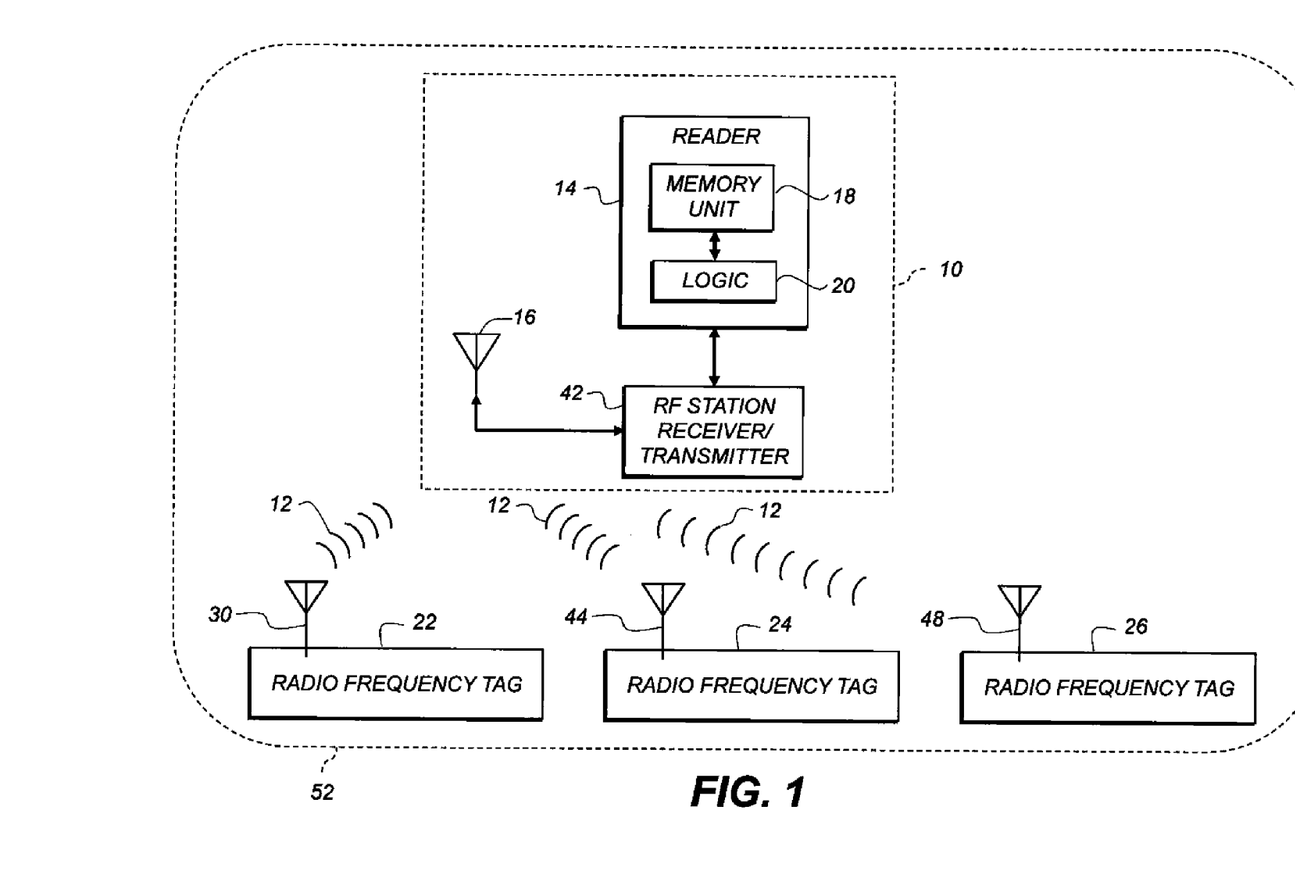
FIG. 1 is a block diagram of an RFID system according to various embodiments.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SG TINs of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52.

Figure 2:
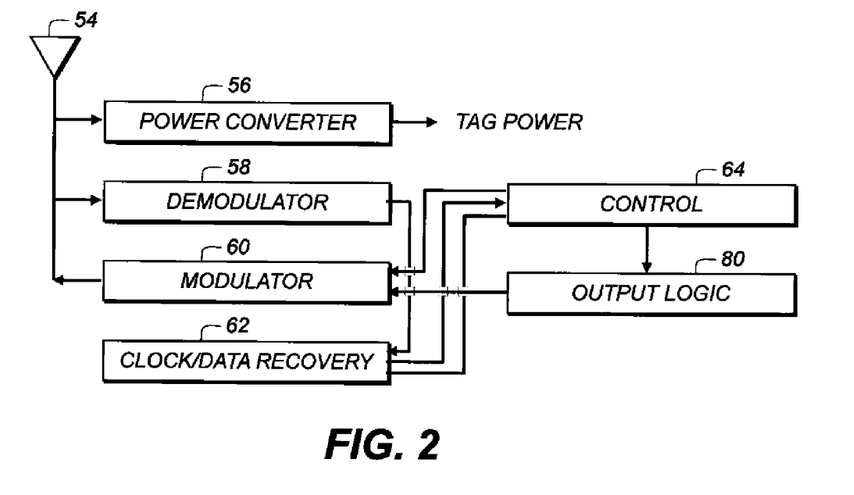
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
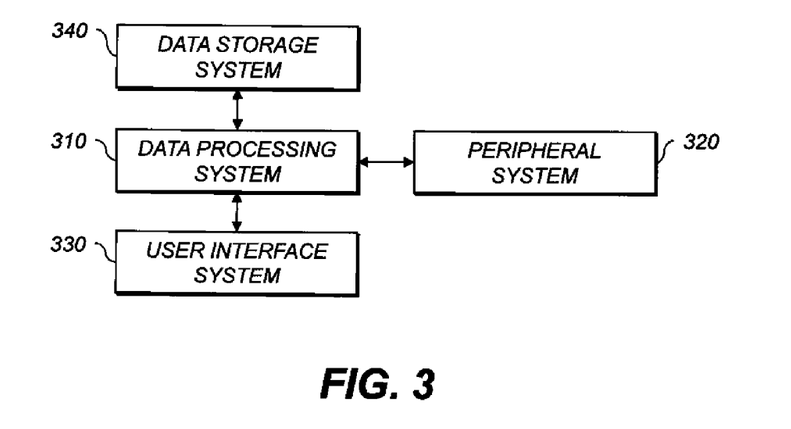
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated.

This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
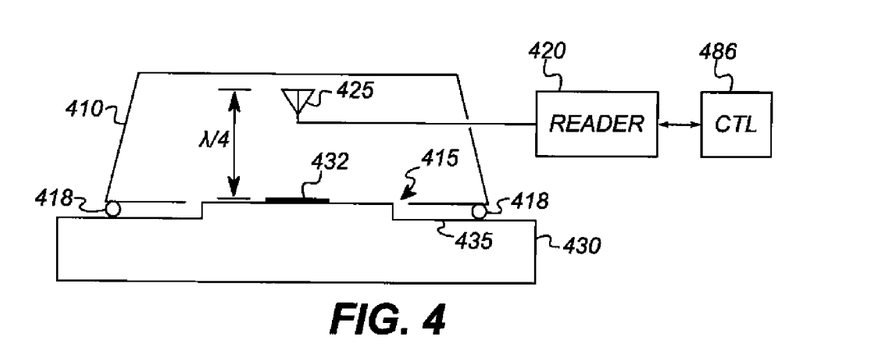
FIGS. 4 and 5 are elevational cross-sections of apparatus for reading an RFID tag according to various embodiments.

FIG. 4 is an elevational cross-section of apparatus for reading RFID tag 432 using RFID reader 420 according to various embodiments. RF-blocking enclosure 410 substantially blocks RF energy at selected RFID wavelength(s) except through port 415. Port 415 can be an opening or RF-transparent window. "Blocking" means that enclosure 410 is designed (e.g., in shape or material) to attenuate incident RF energy, e.g., from a skimmer, until the energy that passes into the enclosure is below the receive sensitivity of the RFID tag, or the response from the RFID tag is below the receive sensitivity of a reader or skimmer outside the enclosure. It is not required that the enclosure be entirely RF-opaque, whether only at a frequency of interest or over a frequency band.

Antenna 425 of reader 420 is located within enclosure 410. The enclosure is positioned so that port 415 is adjacent to conductive surface 435 and RFID tag 432 is within enclosure 410. RFID reader 420 can then be activated at a selected read power level to read the tag in the enclosure. The read power level can be measured, e.g., as the effective isotropic radiated power (EIRP) from the antenna. Controller 486, which can include a CPU, microcontroller, PLD, PLA, PAL, FPGA, ASIC, or other logic or software-execution device, controls the operation of reader 420.

In various embodiments, enclosure 410 is electrically connected to conductive surface 435, e.g., by conductive gasket 418. Gasket 418 can be conductive polymer, wire mesh, or metal tubing. Gasket 418 can also include metal fingers attached to enclosure 410 or surface 435, such as those used to maintain desktop computer enclosures as Faraday cages. Enclosure 410 and conductive surface 435 thus together attenuate RF signals from outside enclosure 410 by at least 60 dB. In various embodiments, the read power level is set so that the return signal from the tag is within 100-110% of the receiver sensitivity.

In various embodiments, enclosure 410 is configured so that port 415 and antenna 425 are separated by a distance substantially equal to a multiple of one-quarter of the selected wavelength. In these embodiments, the RFID tag is positioned just in the port, i.e., surrounded by the edges of the port so it doesn't stick in too far. In various embodiments, enclosure 410 is configured so that a tag position (here, the position of tag 432) and antenna 425 are separated by a distance substantially equal to a multiple of one-quarter of the selected RFID wavelength.

In various embodiments, the RFID tag is attached to non-RFID-active object 430. Object 430 can be a container, smart label, or smart card. Object 430 can be an object that interferes with (e.g., attenuates or diffracts) RF energy, e.g., a metal container or a container of water. Enclosure 410 can provide a consistent position and orientation of antenna 425 with respect to tag 432 on object 430. This permits reading tags on containers (or other objects 430) of various shapes and sizes without recalibrating reader 420 or antenna 425.

In an example, object 430 is a container of ink of a given color. A hose (not shown) draws the ink from object 430 to provide the ink to a printhead. The hose can pass through port 415 or a different opening in enclosure 410. When the container is empty, an operator installs a full container of ink (a different object 430). Controller 486 then detects RFID tag 432 on the new container. If RFID tag 432 on the new container indicates a different classification of fluid (e.g., color or hydrophilic/oliophilic) than RFID tag 432 on the previous container, controller 486 reports an error. This advantageously reduces the probability that, e.g., black ink will be provided to a yellow printhead. Enclosure 410 reduces the probability of reading an RFID tag belonging to a nearby tagged container rather than tag 432 on object 430.

Figure 5:
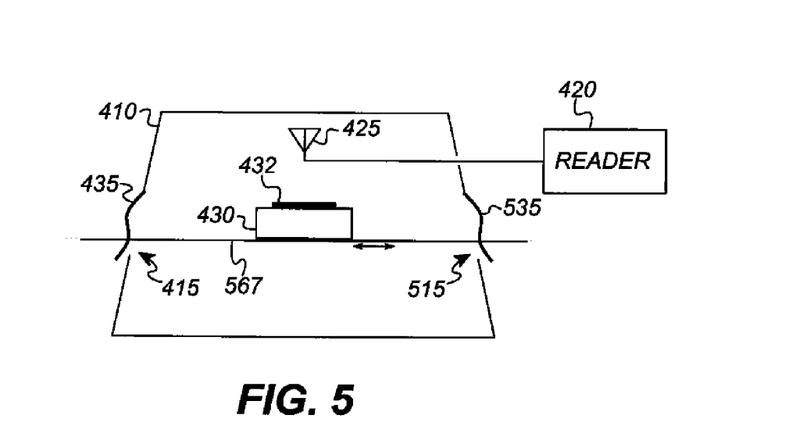

FIG. 5 is an elevational cross-section of apparatus for reading RFID tag 432 using RFID reader 420 with antenna 425 according to various embodiments. Reader 420 can be connected to a controller, as shown in FIG. 4. Conductive surface 435 is a curtain of RF-attenuating material over port 415. For example, surface 435 can include a plurality of laterally-arranged strips of foil. Surface 435 can also be a curtain of chain mail, or a solid flap that swings to permit object 430 to pass. Enclosure 410 also includes second port 515 with curtain 535 of RF-attenuating material over it. In various embodiments, conveyor 567 bears tag 432 or object 430 to which tag 432 is attached, through port 415 and second port 515. Conveyor 567 can include a belt or a plurality of powered rollers.

Figure 6:
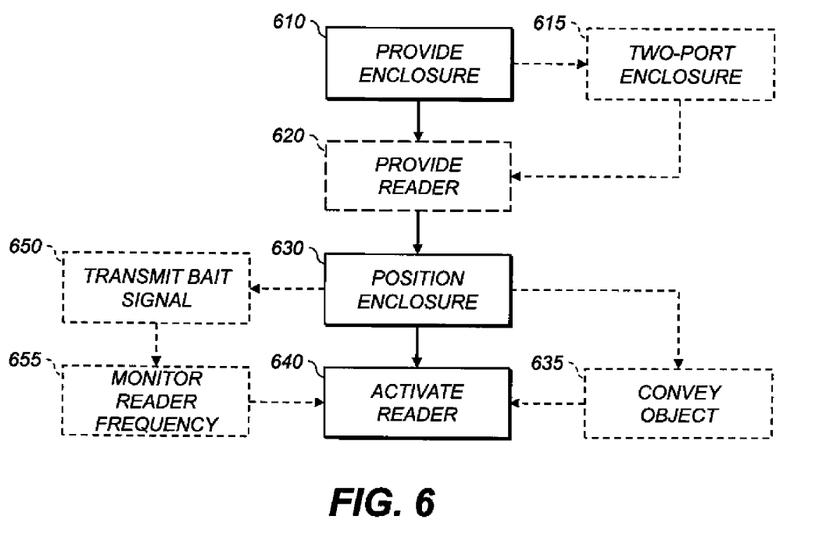
FIG. 6 shows methods of reading an RFID tag using an RFID reader according to various embodiments.

FIG. 6 shows methods of reading an RFID tag using an RFID reader according to various embodiments. Processing begins with step 610.

In step 610, an RF-blocking enclosure having a port is provided, e.g., as discussed above with respect to FIG. 4 or 5. Step 610 is followed by step 620 and optional step 615.

In step 615, in various embodiments, the enclosure is provided having a second port and a curtain of RF-attenuating material over the second port. The conductive surface is a curtain of RF-attenuating material over the port provided in step 610. FIG. 5 shows embodiments useful with this step. Step 615 is followed by step 620.

In step 620, the RFID reader is provided. The antenna of the reader is located within the enclosure. In various embodiments, the reader is received instead of provided. In various embodiments, the provided enclosure has the reader antenna therein, so this step is not required to be performed as a separate operation. In various embodiments, this step includes connecting the reader to the antenna in the enclosure, e.g., by plugging a micro-coaxial cable from the reader into an antenna port on the exterior of the enclosure. Step 620 is followed by step 630.

In step 630, the enclosure is positioned by moving the object, or the enclosure, or both, so that the port is adjacent to a conductive surface and the RFID tag is within the enclosure. In various embodiments, the RFID tag is positioned in the port, and the enclosure is configured so that the port and the antenna are separated by a distance substantially equal to a multiple of one-quarter of the selected wavelength on which the RFID reader transmits. In various embodiments, the RFID tag is positioned at a selected tag position within the enclosure. The enclosure is configured so that the tag position and the antenna are separated by a distance substantially equal to a multiple of one-quarter of the selected wavelength. In various embodiments, the RFID tag is attached to a non-RFID-active object, as discussed above, and the enclosure is positioned with respect to the object. Step 630 is followed by step 640 and can include optional steps 635 or 650.

In step 640, the RFID reader is activated at a selected read power level to read the tag in the enclosure. In various embodiments using step 650, the read power level is lower than a bait power level (discussed below).

In optional step 635, the object is passed through the port and the second port (discussed above with respect to step 615). In various embodiments, the object is carried on a conveyor (e.g., a belt, pushrod, or noose, arranged horizontally, vertically, or in any other direction) through the port and the second port. The object can also be dropped through enclosure and read while it falls, or lowered through the enclosure gradually. While the object is in the enclosure, step 635 is followed by step 640.

In optional step 650, in various embodiments, positioning step 630 includes operating the reader to transmit a bait signal at a selected bait power level greater than the read power level and at a selected reader frequency. The bait pulse is transmitted while the enclosure is positioned so that RF energy can escape the enclosure to reach a skimmer outside. This permits determining whether a skimmer is present while the enclosure is being positioned. In various embodiments, the bait signal is a tag-read pulse. In various embodiments, the bait signal can be transmitted without a secure ID or with different values or parameters than a normal tag-read sequence. Step 650 is followed by step 655.

In optional step 655, after step 650, the selected reader frequency is monitored to listen for skimmers. A controller, e.g., as described above with respect to FIG. 4, can perform the monitoring using the RFID reader. Monitoring can be performed for a selected amount of time, or until the enclosure is in position with respect to the conductive surface. A skimmer is determined to be present if a skimmer RFID signal is detected during monitoring. The tag-read pulse bait signal can elicit a response from tag 432. If a skimmer is within range of the bait signal and is trying to provide a tag to substitute for tag 432, the skimmer RFID signal will be a response to the bait pulse purporting to be from a valid RFID tag. In various embodiments, if only one tag responds to the bait pulse, it is determined to be tag 432. If two tags respond to the bait pulse, at least one of the responses is a skimmer RFID signal.

In another example, the bait pulse is a synthesized tag response signal. A skimmer trying to read the data off a tag to clone it will see the synthesized response and attempt to read the tag itself. If a read request is received during the monitoring, that request is determined to be a skimmer RFID signal.

In various embodiments, dense-reader mode is used. The bait pulse is a read pulse. A skimmer operating in dense-reader mode to improve its tag read success rate will, in response to the bait signal, select a time to attempt to read the RFID tag.

If the skimmer negotiates a dense-reader mode timeslot, the signals used to perform negotiation are skimmer RFID signals, since only one reader should be present to read tag 432 (in these embodiments). In various of these embodiments, the reader monitors the power level of each read request in each timeslot. A received power level that indicates the transmitter was transmitting outside of the power levels permitted by the relevant specification (e.g., the EPC Class-1 Generation-2 UHF RFID Protocol for Communications at 860 MHz-960 MHz, Version 1.2.0, Oct. 23, 2008, incorporated herein by reference) is determined to correspond to a skimmer RFID signal, since non-skimmer readers obey the standard (in these embodiments).

If the skimmer does not negotiate a timeslot, but instead attempts to read the tag during another reader's slot, or between slots, that attempt is a skimmer RFID signal. No reader should transmit except as determined by the dense-reader mode negotiation (in these embodiments).

In various embodiments, the tag and the controller transmit data modulated with multiple, different subcarriers, e.g., with OFDM. A skimmer designed for a single-carrier RFID tag will not be able to detect that a tag is present, much less read the tag.

In various embodiments, the controller periodically or intermittently attempts to read the tag at the read power level. On each read attempt, if a signal from the tag is received, the controller or RFID reader determines a received signal strength from the tag. Monitoring is discontinued when the received signal strength exceeds a selected threshold. The threshold is selected so that the position of the enclosure with respect to the surface when the received signal strength exceeds the threshold provides sufficient RF attenuation to reduce the probability of a skimmer's being able to access the tag below a desired level. In various embodiments, each attempt to read the tag attempts to read only some, but not all, data stored in the tag. In this way, a rogue reader eavesdropping on communications with the tag before the enclosure is in position to block them will not receive all the data stored in the tag. Step 655 is followed by step 640.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

10 base station
12 air interface
14 reader
16 reader's antenna
18 memory unit
20 logic unit
22, 24, 26 RFID tag
30, 44, 48 antenna 42 RF station
52 range
54 antenna
56 power converter
58 demodulator
60 modulator
62 clock/data recovery circuit
64 control unit
80 output logic
310 data-processing system
320 peripheral system
330 user-interface system
340 data-storage system
410 enclosure
415 port
418 conductive gasket
420 reader
425 antenna
430 object
432 RFID tag
435 conductive surface
486 controller
515 port
535 conductive curtain
567 conveyor
610 provide enclosure step
615 two-port enclosure step
620 provide reader step
630 position enclosure step
635 convey object step
640 activate reader step
650 transmit bait signal step
655 monitor reader frequency step

The invention claimed is:

1. A method of reading an RFID tag using an RFID reader, comprising:
providing an RF-blocking enclosure having a port, wherein an antenna of the RFID reader is located within the enclosure;
positioning the enclosure so that the port is adjacent to a conductive surface and the RFID tag is within the enclosure;
activating the RFID reader at a selected read power level to read the tag in the enclosure; and
wherein the RFID reader transmits on a selected wavelength, the enclosure is configured so that the port and the antenna are separated by a distance substantially equal to a multiple of one-quarter of the selected wavelength, and the positioning step includes positioning the RFID tag in the port.

2. The method according to claim 1, wherein the RFID tag is attached to a non-RFID-active object and the positioning step includes positioning the enclosure with respect to the object.

3. The method according to claim 2, wherein the object is a container.

4. The method according to claim 2, wherein the object is a smart label or a smart card.

5. The method according to claim 1, wherein the enclosure is electrically connected to the conductive surface, so that the enclosure and the conductive surface together attenuate RF signals from outside the enclosure by at least 60 dB.

6. The method according to claim 1, wherein the positioning step includes operating the reader to transmit a bait signal at a selected bait power level greater than the read power level and at a selected reader frequency, and the method includes a subsequent skimmer-detection step of monitoring the selected reader frequency, wherein a skimmer is determined to be present if a skimmer RFID signal is detected.

7. The method according to claim 6, wherein the skimmer-detection step further includes attempting to read the tag at the read power level and determining a received signal strength from the tag, so that monitoring is discontinued when the received signal strength exceeds a selected threshold.

8. The method according to claim 7, wherein the attempting during skimmer-detection step includes attempting to read only some, but not all, data stored in the tag.

9. A method of reading an RFID tag using an RFID reader, comprising:
providing an RF-blocking enclosure having a port, wherein an antenna of the RFID reader is located within the enclosure;
positioning the enclosure so that the port is adjacent to a conductive surface and the RFID tag is within the enclosure;
activating the RFID reader at a selected read power level to read the tag in the enclosure; and
wherein the RFID reader transmits on a selected wavelength, further including selecting a tag position within the enclosure, the enclosure is configured so that the tag position and the antenna are separated by a distance substantially equal to a multiple of one-quarter of the selected wavelength, and the positioning step includes positioning the RFID tag at the tag position.

10. A method of reading an RFID tag using an RFID reader, comprising:
providing an RF-blocking enclosure having a port, wherein an antenna of the RFID reader is located within the enclosure;
positioning the enclosure so that the port is adjacent to a conductive surface and the RFID tag is within the enclosure;
activating the RFID reader at a selected read power level to read the tag in the enclosure; and
wherein the RFID tag is attached to a non-RFID-active object and the positioning step includes positioning the enclosure with respect to the object and the enclosure-providing step includes providing the enclosure having a second port and a curtain of RF-attenuating material over the second port, wherein the conductive surface is a curtain of RF-attenuating material over the port; the method further including passing the object through the port and the second port; and the activating step including activating the RFID reader while the object is in the enclosure.

* * * * *